(No Model.)
V. H. ERNST.
SECONDARY BATTERY.
No. 408,002. Patented July 30, 1889.
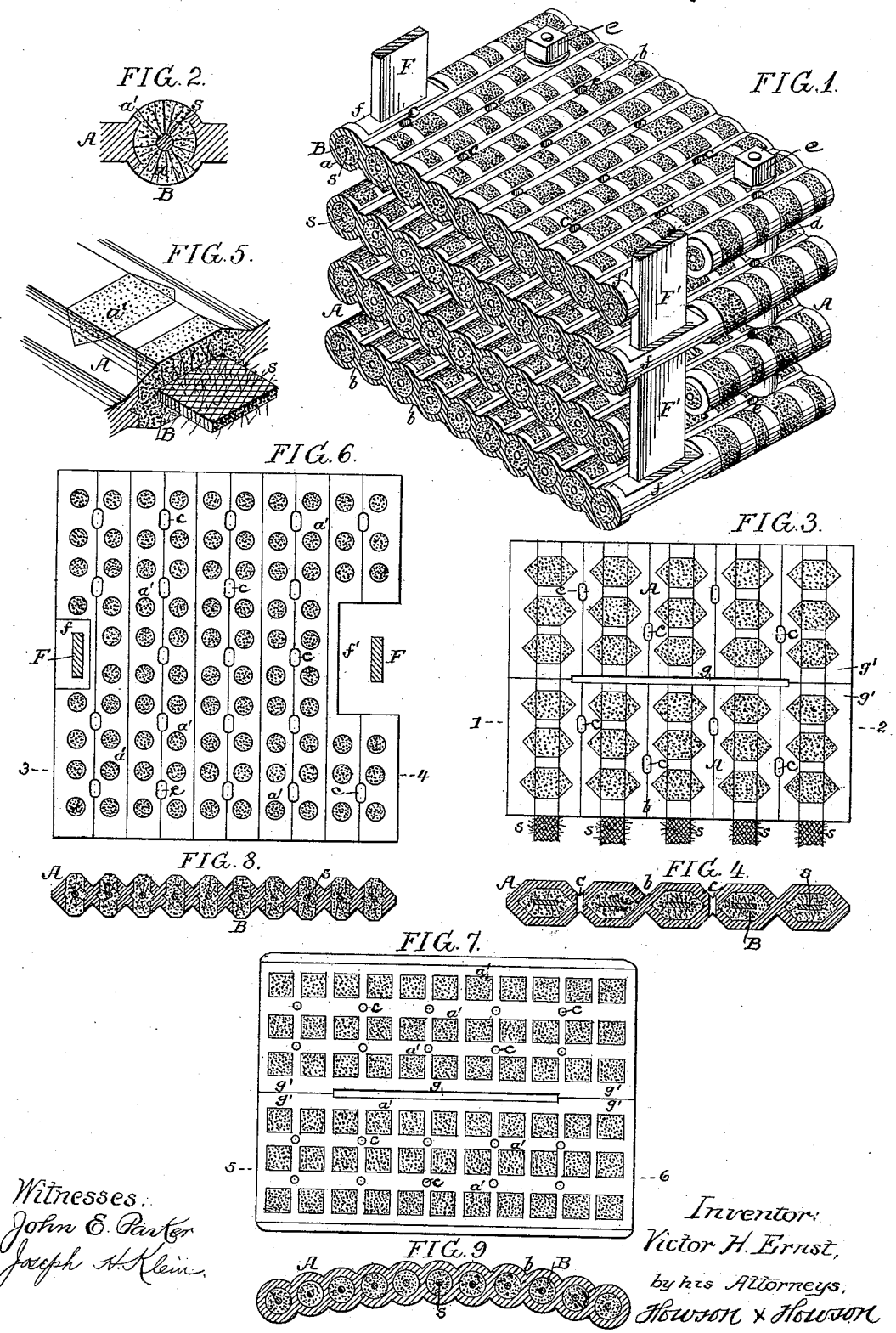
Witnesses:
John E. Parker
Joseph H. Klein
Inventor:
Victor H. Ernst,
by his Attorneys,
Howson & Howson

UNITED STATES PATENT OFFICE.

VICTOR H. ERNST, OF JERSEY CITY, NEW JERSEY.

SECONDARY BATTERY.

SPECIFICATION forming part of Letters Patent No. 408,002, dated July 30, 1889.

Application filed February 12, 1889. Serial No. 299,629. (No model.)

*To all whom it may concern:*

Be it known that I, VICTOR H. ERNST, a citizen of the United States, and a resident of Jersey City, Hudson county, New Jersey, have invented certain Improvements in Storage-Batteries, of which the following is a specification.

One object of my invention is to so construct a storage-battery plate that the dilute acid will penetrate the active material more thoroughly than in batteries as heretofore made, a further object being to permit the free expansion and contraction of the active material without risk of loosening it from the plate, and a still further object being to so construct the plate as to allow for the free escape of gas-bubbles. These objects I attain as fully described hereinafter, reference being had to the accompanying drawings, in which—

Figure 1 is a perspective view of a number of battery-plates constructed in accordance with my invention. Fig. 2 is an enlarged transverse section of a portion of the plate. Fig. 3 is a plan view showing a different form of plate embodying the invention. Fig. 4 is a section on the line 1 2, Fig. 3. Fig. 5 is a perspective view of a portion of the plate shown in Fig. 3. Figs. 6 and 7 are plan views of still other forms of my improved plate. Fig. 8 is a section on the line 3 4, Fig. 6; and Fig. 9 is a section on the line 5 6, Fig. 7.

As shown in Fig. 1, the plate A has a series of longitudinal openings $a$, the outside of the plate being rounded, as shown, so as to form a series of grooves $b$, and extending from each of the longitudinal openings $a$ to the outside of the plate are transverse openings $a'$. The active material B is placed in the plate in the usual manner, either in a plastic or fusible form, this active material being exposed at the openings $a'$, thus forming rows of active material, and between each row and extending from one grooved face of the plate to the other are openings $c$, the openings in the respective plates being directly above each other, so that when the plates are placed one above another the openings provide for the escape of gas-bubbles, which naturally form on the under sides of the plates. The grooves on the under side of each plate form tapered or funnel-shaped mouths for the openings.

The openings $c$ may be of any desired form, either oblong, as shown in Figs. 1, 3, and 6, or round, as shown in Fig. 7, this being immaterial.

The plates, as shown in Fig. 1, are piled one above another, and are separated by the usual washers or blocks $d$, Fig. 1, bolts $e$ passing through the different plates and washers and securing said plates together. Each plate has a portion $f$, extending in which is a slot for the reception of the terminal F or F', and in the opposite edge of each plate is a recess $f'$.

In assembling the plates in horizontal alignment the portions $f$ of the negative plates are arranged directly one under another and the portions $f$ of the positive plates are likewise arranged on the opposite side.

The negative plates, being notched, as above described, at the points $f'$, permit the free passage of the positive terminal F', while the notches or recesses $f'$ of the positive plates permit the free passage of the negative terminal, as shown clearly in Fig. 1. These terminals F F' are forced into and through the terminal orifices or slots in the plates, and are secured in their places by the heat of a hydrogen flame, thus forming a perfect electrical union and securely holding the plates in proper position without the use of solder.

The plates may be of any form which is most desirable. For instance, the plate may be of the form shown in Figs. 3 and 4, having V-grooves $b$ in the surface, for the same purpose as the grooves in Fig. 1, the plate having hexagonal openings for the active material.

In Figs. 6 and 8 I have shown the plate having V-grooves $b$ and rectangular longitudinal openings with conical or transverse openings for the active material, and in Figs. 7 and 9 I have shown a concavo-convex plate shaped externally as in Fig. 1, and having circular longitudinal openings and quadrangular transverse openings for the active material.

The plates shown in Figs. 3, 4, and 5 are made in sections secured together by burning or otherwise, the plate being cut away at the central portion $g$, leaving end portions $g'$, the object of which construction is to make a perfect joint between the two sections, and at the same time provide an opening $g$, which forms a suitable outlet for the escape of the gas-bubbles above mentioned. I have shown only two sections fastened together in these views; but it will be understood that a series of sections may be joined, the number depending altogether upon the desired size of the plate.

The object of the concavo-convex or arched form of plate shown in Fig. 9 is to prevent the plate from sagging when the material is exposed to the action of the acids, for it frequently happens, especially in large battery-plates, that the plates warp and buckle and tend to sag at the center, owing to expansion. I overcome this difficulty by arching the plates, as shown in Fig. 9, so that if the plates should warp or buckle they cannot sag, and therefore cannot interfere with each other, thus making a much stronger battery-plate than usual.

Some of the most important features of my invention are the plans of providing for the access of the acid to all parts of the active material of the plate and of permitting free expansion and contraction of the active material without loosening it from the plate. These I will now proceed to describe.

Inserted in each opening of the plate shown in the drawings is a core or wick $s$, projecting from which are a number of fibrous ends or strands, as clearly shown in Fig. 2, these ends extending to or nearly to the surface of the plate. These cores or wicks are preferably inserted in the openings of the plate prior to the filling of the same with the active material, and when the cores are in position the active material is formed around the same in the usual way—that is, either by smearing or casting said material into the plate in a plastic or fusible form, the material being exposed on the surface of the plate, as usual. The core may be of asbestus or other absorbent material indestructible by the acids. The dilute acid penetrates the active material through the medium of the absorbent fiber and reaches all portions of said active material.

Instead of the round cores shown in Fig. 2, a flat core or tape, as shown in Figs. 3, 4, and 5, may be used, this tape having leaders or ends projecting therefrom which penetrate all portions of the active material.

The core not only acts as an absorbent for the dilute acids, but also allows for the free contraction and expansion of the active material, and for this purpose the core or material combined with the active agent may be simply a yielding substance and not an absorbent, so that if the active material expands said material, being bound by the supporting-plate, will compress the core, and thus prevent the breaking loose of the active material from the plate. As the active material expands under the action of the electric current the material closes upon the yielding or compressible material with which it is combined, and when the active material shrinks the compressed material expands; hence under all conditions the active material is rigidly confined by the metallic casing of the plate.

Having thus described my invention, I claim and desire to secure by Letters Patent—

1. The combination, in a storage-battery plate, of a body of active material with a yielding core of material indestructible by the acid of the battery, substantially as described.

2. The combination, in a storage-battery plate, of a body of active material with an absorbent core of material indestructible by the acid of the battery, substantially as described.

3. The combination, in a storage-battery plate, of a body of active material with a core of material indestructible by the acid of the battery and having a yielding and absorbent nature, substantially as described.

4. A storage-battery plate having a body of active material with a yielding or absorbent core of material indestructible by the acid of the battery, and having a series of fibrous ends or leaders projecting from the core into the active material of the plate, substantially as described.

5. A storage-battery plate having transverse openings or vents in portions of the plate, said openings or vents having tapered mouths, whereby the bubbles are carried from the under side of the plate through the openings, substantially as described.

6. A storage-battery plate having longitudinal grooves in one or both faces, with transverse openings or vents in said grooved portions of the plate, substantially as and for the purpose described.

7. The combination of a series of battery-plates, each having a terminal orifice at one side and a notch at the opposite side, the notches of the negative plates being above the orifices of the positive plates, with a single positive terminal adapted to be passed through and be secured to the positive plates and a single negative terminal adapted to be passed through and be secured to the negative plates, substantially as described.

8. A battery-plate arched or convex in cross-section, substantially as and for the purpose described.

In testimony whereof I have signed my name to this specification in the presence of two subscribing witnesses.

VICTOR H. ERNST.

Witnesses:
HENRY TRAPHAGEN,
THOMAS A. REILLY.